United States Patent
Parker

(10) Patent No.: US 12,415,442 B2
(45) Date of Patent: Sep. 16, 2025

(54) MOUNTING SYSTEM FOR SEAT FRAME STRUCTURE

(71) Applicant: Safran Seats USA LLC, Gainesville, TX (US)

(72) Inventor: Charles Michael Parker, Irvine, CA (US)

(73) Assignee: Safran Seats USA LLC, Gainesville, TX (US)

( * ) Notice: Subject to any disclaimer, the term of this patent is extended or adjusted under 35 U.S.C. 154(b) by 82 days.

(21) Appl. No.: 17/540,958

(22) Filed: Dec. 2, 2021

(65) Prior Publication Data
US 2023/0173957 A1    Jun. 8, 2023

(51) Int. Cl.
*B60N 2/24* (2006.01)
*B60N 2/015* (2006.01)
*B60N 2/427* (2006.01)
*B64D 11/06* (2006.01)

(52) U.S. Cl.
CPC ......... *B60N 2/242* (2013.01); *B60N 2/01516* (2013.01); *B60N 2/42736* (2013.01); *B64D 11/0648* (2014.12); *B64D 11/0649* (2014.12); *Y10T 403/7111* (2015.01)

(58) Field of Classification Search
None
See application file for complete search history.

(56) References Cited

U.S. PATENT DOCUMENTS

| | | | | | |
|---|---|---|---|---|---|
| 3,221,743 | A | * | 12/1965 | Thompson | A61G 13/10 600/233 |
| 4,297,922 | A | * | 11/1981 | Higdon | E21B 19/164 81/57.2 |
| 4,375,300 | A | * | 3/1983 | Long | B64D 11/0648 297/445.1 |
| 4,489,978 | A | * | 12/1984 | Brennan | B64D 11/06 244/118.6 |
| 4,617,916 | A | * | 10/1986 | LeVahn | A61B 90/50 600/231 |

(Continued)

FOREIGN PATENT DOCUMENTS

| | | | |
|---|---|---|---|
| GB | 647356 A | * | 12/1950 |
| GB | 894214 A | * | 4/1962 |
| JP | 07215220 A | * | 8/1995 |

*Primary Examiner* — Syed A Islam
(74) *Attorney, Agent, or Firm* — Kilpatrick Townsend & Stockton LLP

(57) ABSTRACT

Described are aircraft seat frame assemblies comprising a tube and a seat frame component mounting system. The seat frame component mounting system comprises a first tube mounting member and a second tube mounting member separable from the first tube mounting member. The tube is positionable between the first tube mounting member and the second tube mounting member. The seat frame component mounting system further comprises a fastener extending at least partially through the second tube mounting member, the tube, and the first tube mounting member to couple the second tube mounting member to the first tube mounting member. A clamping force is substantially evenly applied from the second tube mounting member and the first tube mounting member against an outer circumferential surface of the tube via the fastener.

17 Claims, 6 Drawing Sheets

(56) References Cited

U.S. PATENT DOCUMENTS

| | | | | |
|---|---|---|---|---|
| 4,718,719 A | * | 1/1988 | Brennan | B64D 11/0696 296/68.1 |
| 4,783,097 A | * | 11/1988 | Browning | B60R 13/00 D12/222 |
| 5,038,430 A | * | 8/1991 | Bly | A61G 7/0507 5/430 |
| 5,224,680 A | * | 7/1993 | Greenstein | A61B 90/50 600/230 |
| 5,297,890 A | * | 3/1994 | Commins | F16L 3/12 403/384 |
| 5,553,923 A | * | 9/1996 | Bilezikjian | B64D 11/0696 297/452.2 |
| 5,888,197 A | * | 3/1999 | Mulac | A61B 17/02 403/396 |
| 5,897,087 A | * | 4/1999 | Farley | A61B 90/50 248/316.2 |
| 5,921,629 A | * | 7/1999 | Koch | B64D 11/06 297/440.16 |
| 6,033,363 A | * | 3/2000 | Farley | A61B 90/57 600/234 |
| 6,974,276 B2 | * | 12/2005 | Kirchner | F16B 7/0486 248/62 |
| 8,172,840 B2 | * | 5/2012 | Murner | A61B 17/6466 403/384 |
| 8,393,680 B2 | * | 3/2013 | Zimmermann | B64D 11/0693 297/248 |
| 2003/0094838 A1 | * | 5/2003 | Williamson | B64D 11/0696 297/232 |
| 2003/0214153 A1 | * | 11/2003 | Kanie | B62D 25/2072 296/193.07 |
| 2008/0247818 A1 | * | 10/2008 | Oesch | F16B 2/065 403/389 |
| 2008/0312509 A1 | * | 12/2008 | Jacobson | A61B 90/57 600/230 |
| 2009/0088751 A1 | * | 4/2009 | Mullaney | A61B 17/6466 606/54 |
| 2012/0004659 A1 | * | 1/2012 | Miller | A61B 17/6466 606/54 |
| 2017/0021933 A1 | * | 1/2017 | Pozzi | B64D 11/0648 |
| 2018/0244393 A1 | * | 8/2018 | Malligere | F16B 7/0433 |
| 2019/0002106 A1 | * | 1/2019 | Stachel | B64D 11/0648 |
| 2020/0010037 A1 | * | 1/2020 | Davenport | B60R 16/08 |
| 2021/0186562 A1 | * | 6/2021 | Mullaney | A61B 17/6425 |
| 2021/0190261 A1 | * | 6/2021 | Warner | F16M 11/16 |
| 2021/0330420 A1 | * | 10/2021 | Nowak | A61B 17/0206 |
| 2022/0349433 A1 | * | 11/2022 | Wang | F16B 2/10 |
| 2023/0098104 A1 | * | 3/2023 | Nowak | F16B 2/185 600/229 |
| 2023/0320715 A1 | * | 10/2023 | Martin | A61B 90/50 600/231 |
| 2024/0140607 A1 | * | 5/2024 | Madrid | B64D 11/0619 |
| 2024/0182172 A1 | * | 6/2024 | Omoragbon | B64D 11/06 |

* cited by examiner

US 12,415,442 B2

MOUNTING SYSTEM FOR SEAT FRAME STRUCTURE

FIELD OF THE INVENTION

The field of the invention relates to passenger seats, and, more particularly, to seat frame mounting assemblies for passenger seats.

BACKGROUND

Passenger vehicles, such as aircraft, buses, trains, ships, and automobiles, often include one or more passenger seats in which passengers may be seated and otherwise use during travel. A passenger seat may include a seat frame assembly that connects to and supports structural tubes of the passenger seat. Traditionally, such seat frame assemblies have been a single-piece construction with either a clamping system adjacent to a portion of the seat frame assembly in which a structural tube is positioned or a bolt-through design through the structural tube. The clamping system often generates stress corrosion cracking and other mechanical failures in the structural tube, and the bolt-through design permits undesired movement between the seat frame assembly and the structural tubes.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a passenger seat comprises: a tube; and a seat frame component mounting system comprising: a first tube mounting member; a second tube mounting member separable from the first tube mounting member, wherein the tube is positionable between the first tube mounting member and the second tube mounting member; and a fastener extending at least partially through the second tube mounting member, the tube, and the first tube mounting member to couple the second tube mounting member to the first tube mounting member; and wherein a clamping force is substantially evenly applied from the second tube mounting member and the first tube mounting member against an outer circumferential surface of the tube via the fastener.

In some embodiments, the first tube mounting member may be integrally formed with a seat frame component.

In certain embodiments, an entirety of an inner surface of at least one of the first tube mounting member or the second tube mounting member may be in contact with at least a portion of the outer circumferential surface of the tube.

The least one of the first tube mounting member or the second tube mounting member, in some embodiments, comprises at least one guide member.

The other of the at least one of the first tube mounting member or the second tube mounting member, in certain embodiments, comprises at least one opening.

In some embodiments, the second tube mounting member is positionable relative to the first tube mounting member so that the at least one guide member substantially aligns with the at least one opening.

In certain embodiments, the at least one second fastener is coupleable to the first tube mounting member and extends at least partially through the at least one opening, the at least one guide member, and the first tube mounting member.

In some embodiments, there is at least one gap between the first tube mounting member and the second tube mounting member in an area of the first tube mounting member and the second tube mounting member comprising the at least one opening and the at least one guide member.

According to certain embodiments of the present invention, a method (which may incorporate features of any of the preceding or subsequent examples) for assembling a passenger seat comprising a tube and a seat frame component mounting system comprises: positioning the tube between a first tube mounting member and a second tube mounting member, wherein the second tube mounting member is separable from the first tube mounting member; inserting a fastener at least partially through the second tube mounting member, the tube, and the first tube mounting member to couple the second tube mounting member to the first tube mounting member; and tightening the fastener to apply a clamping force from the second tube mounting member and the first tube mounting member substantially evenly against an outer circumferential surface of the tube.

In some embodiments, an entirety of an inner surface of at least one of the first tube mounting member or the second tube mounting member is in contact with at least a portion of the outer circumferential surface of the tube.

In certain embodiments, at least one of the first tube mounting member or the second tube mounting member comprises at least one guide member and at least one opening.

The method, in some embodiments, further comprises aligning the first tube mounting member and the second tube mounting member by aligning the at least one guide member of the at least one of the first tube mounting member or the second tube mounting member with the at least one opening of at least one of the first tube mounting member or the second tube mounting member.

The method, in certain embodiments, further comprises coupling at least one second fastener to the first tube mounting member, wherein the at least one second fastener extends at least partially through the at least one opening, the at least one guide member, and the first tube mounting member.

In some embodiments, there is at least one gap between the first tube mounting member and the second tube mounting member in an area of the first tube mounting member and the second tube mounting member comprising the at least one opening and the at least one guide member.

According to certain embodiments of the present invention, a seat frame component mounting system comprises: a first tube mounting member; a second tube mounting member separable from the first tube mounting member and moveable relative to the first tube mounting member along a linear axis; and a fastener extending at least partially through the second tube mounting member and the first tube mounting member to couple the second tube mounting member to the first tube mounting member.

In some embodiments, the first tube mounting member is integrally formed with a seat frame component.

The linear axis, in certain embodiments, extends substantially along a central axis extending through the fastener.

In some embodiments, at least one of the first tube mounting member or the second tube mounting member comprises at least one guide member and at least one opening.

The second tube mounting member, in certain embodiments, is positionable relative to the first tube mounting member so that the at least one guide member substantially aligns with the at least one opening.

In some embodiments, there is at least one gap between the first tube mounting member and the second tube mounting member in an area of the first tube mounting member and the second tube mounting member comprising the at least one opening and the at least one guide member.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide seat frame component mounting systems for passenger seats. While the seat frame component mounting systems are discussed for use with aircraft seats, they are by no means so limited. Rather, embodiments of the seat frame component mounting systems may be used in passenger seats or other seats of any type or otherwise as desired.

Figure 1:
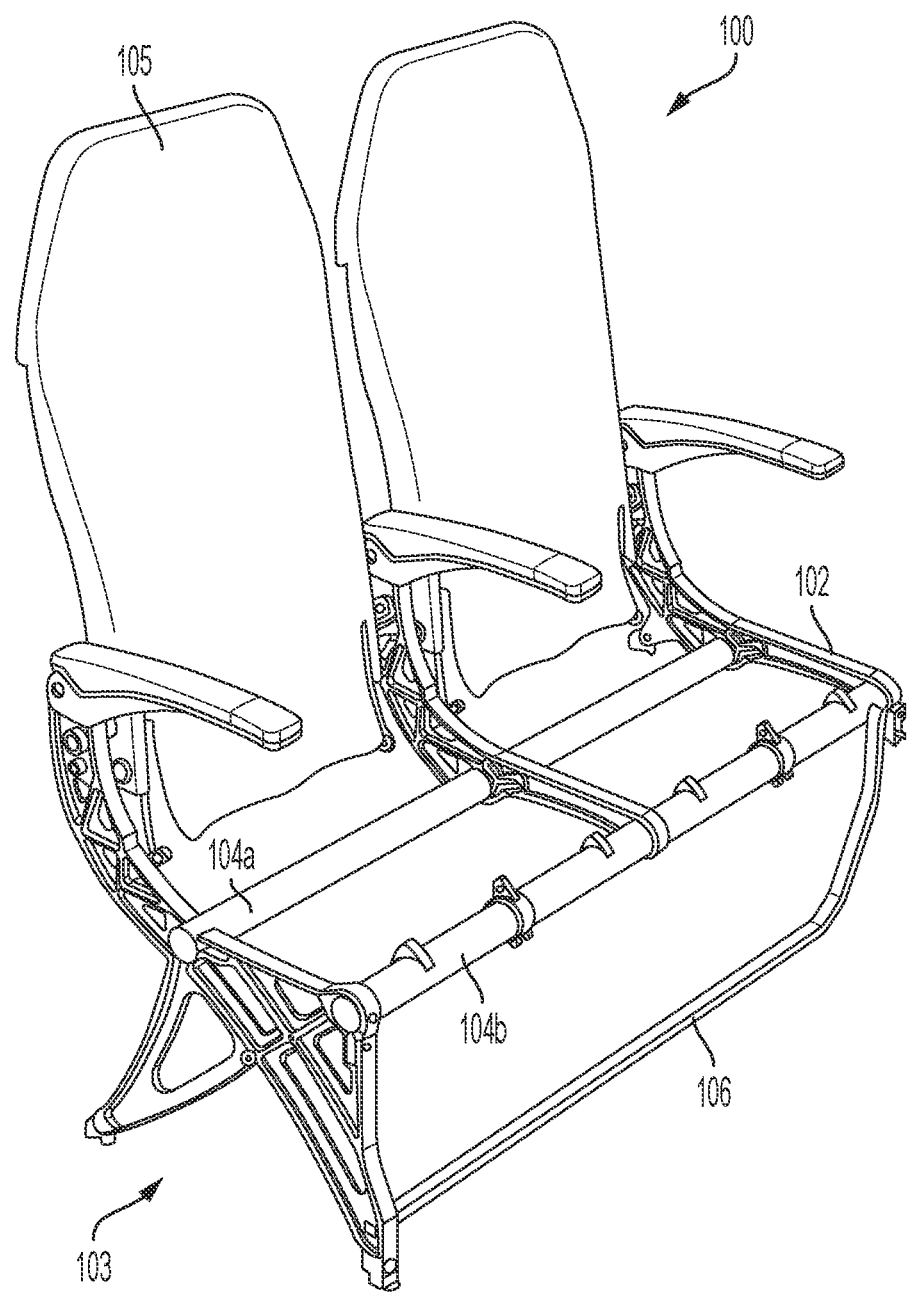
FIG. 1 is a perspective view of a generalized passenger seat according to certain embodiments of the present invention.

According to certain embodiments of the invention, e.g., as shown in FIG. 1, a generalized passenger seat 100 may include one or more seat frame component mounting systems 102 and one or more seat back assemblies 105 that may each include various components that provide support for a passenger in the generalized passenger seat 100. Various components include, but are not limited to, one or more spreaders, arm rests, seat legs, etc. The generalized passenger seat 100 may be coupled to a seat track via a set of seat track fittings (e.g., a first seat track fitting and a second seat track fitting).

The generalized passenger seat 100 may include a leg assembly 103 that may mechanically couple or otherwise couple the generalized passenger seat 100 to a floor and/or the seat track of a passenger vehicle such as an airplane or other suitable passenger vehicle. As illustrated, the leg assembly 103 is a single-part leg assembly in which the leg assembly 103 contains one piece. Additionally, as illustrated, couplings associated with the leg assembly 103 may be fixed. While the leg assembly 103 is illustrated as a single component in FIG. 1, in other embodiments the leg assembly 103 may be a multi-part assembly.

In certain embodiments, the generalized passenger seat 100 may include at least one tube 104, and in certain embodiments, the generalized passenger seat 100 may include two or more tubes 104. Accordingly, while two tubes 104a-b are illustrated, the generalized passenger seat 100 may include any number of tubes 104 as desired, including a single tube 104 or more than two tubes 104. The tubes 104 may include uniform tubes, non-uniform tubes, or a combination thereof. Moreover, the particular tubes 104 illustrated should not be considered limiting, and other portions of the seat frame component mounting systems 102 may include a tube 104 as desired. A fully assembled generalized passenger seat 100 may include various cushioning, a bottom seat pan, in-flight entertainment equipment, tray tables, and/or other components as desired. Optionally, the generalized passenger seat 100 may include a baggage bar 106 that may be coupled to the leg assembly 103.

According to certain embodiments of the present invention, and as best illustrated in FIGS. 2-5, the seat frame component mounting system 200 for a passenger seat may include a first tube mounting member 202, a second tube mounting member 204, and a fastener 206. The seat frame component mounting system 200 may be the same as or similar to the seat frame component mounting system 102 discussed above with respect to FIG. 1. Each of the first tube mounting member 202, the second tube mounting member 204, the fastener 206, and any other component of the seat frame component mounting system 200 may be formed from at least one of steel, steel alloy, stainless steel, titanium, aluminum, or any other material suitable for providing the necessary strength or other necessary physical and/or chemical characteristics of each of the components.

In some embodiments, the first tube mounting member 202 may be integrally formed with a seat frame component 208. Various seat frame components include a seat leg, a spreader, or any other suitable component of a seat frame. The second tube mounting member 204 may be separable from the first tube mounting member 202. Additionally, the second tube mounting member 204 may be moveable relative to the first tube mounting member 202 along a linear axis, which may extend substantially along a central axis extending through the fastener 206 or may extend in any other suitable direction relative to the first tube mounting member 202.

Figure 2:
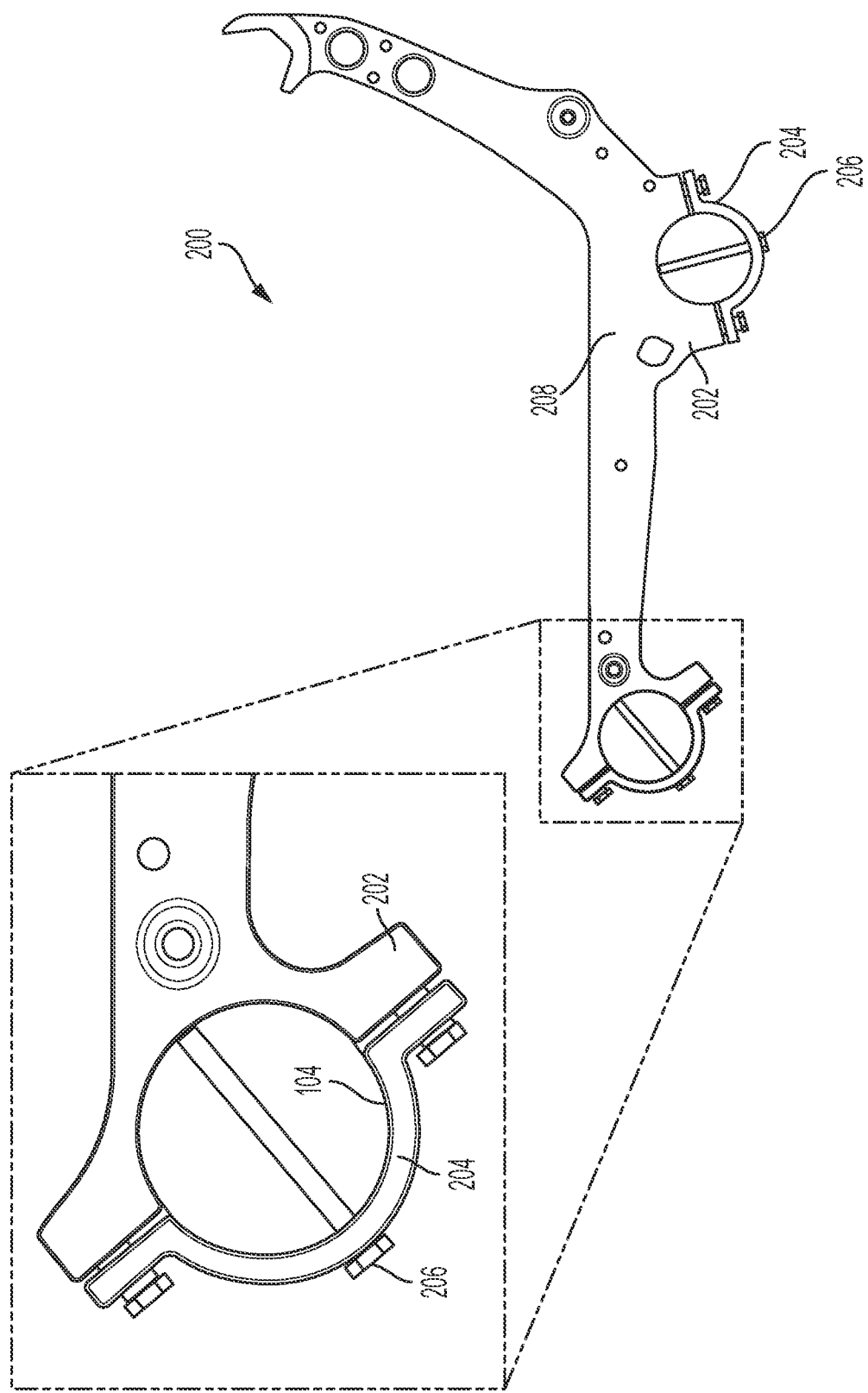
FIG. 2 is a partial side view of a seat frame component mounting system of the generalized passenger seat of FIG. 1 according to certain embodiments of the present disclosure.
Figure 5:
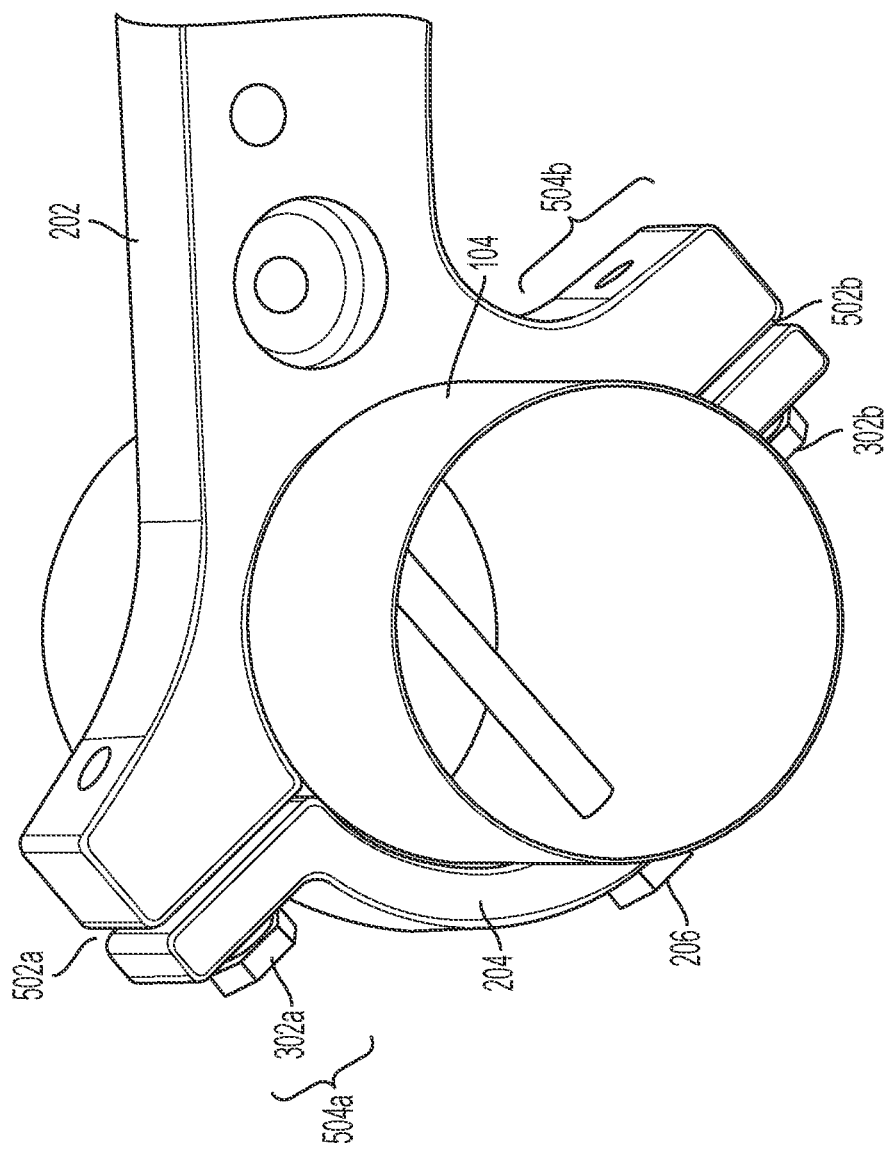
FIG. 5 is a partial perspective view of the generalized passenger seat of FIG. 1 according to certain embodiments of the present disclosure.

As shown in FIGS. 2 and 5, the tube 104 may be positioned between the first tube mounting member 202 and the second tube mounting member 204. The size of the first tube mounting member 202 and/or the second tube mounting member 204 may be interchangeable. For example, the diameter of each of the first tube mounting member 202 and the second tube mounting member 204 may be adjusted based on a size of the tube 104.

The fastener 206 may extend at least partially through the second tube mounting member 204, the tube 104, and the first tube mounting member 202 to couple the second tube mounting member 204 to the first tube mounting member 202 and secure the tube 104 between the second tube mounting member 204 and the first tube mounting member 202. Examples of the fastener 206 may include but are not limited to screws, bolts, rivets or other mechanical or chemical fasteners. The fastener 206 may extend substantially through a center of an opening formed between the first tube mounting member 202 and the second tube mounting member 204. However, the fastener 206 may also extend through the opening at any suitable angle and/or position.

In some embodiments, the opening between the first tube mounting member 202 and the second tube mounting member 204 is sized so that the tube 104 is flush with a surface of the first tube mounting member 202 and the second tube mounting member 204 when the tube 104 is positioned within the opening. With the tube 104 positioned within the opening between the first tube mounting member 202 and the second tube mounting member 204, the fastener 206 may extend substantially through a center of the tube 104. However, the fastener 206 may also extend through the tube at any suitable angle and/or position.

In certain embodiments, an inner surface of at least one of the first tube mounting member 202 or the second tube mounting member 204 contours to an outer circumferential surface of the tube 104. For example, with the fastener 206 coupling the first tube mounting member 202 to the second tube mounting member 204 with the tube 104 positioned between the first tube mounting member 202 to the second tube mounting member 204, an entirety of an inner surface of at least one of the first tube mounting member 202 or the second tube mounting member 204 may be in contact with at least a portion of the outer circumferential surface of the tube 104.

At least one of the first tube mounting member 202 and the second tube mounting member 204 may provide a clamping force to the outer circumferential surface of the tube 104 via the fastener 206. In some embodiments, the clamping force may be substantially evenly applied from at least one of the second tube mounting member 204 or the first tube mounting member 202 against the outer circumferential surface of the tube. Additionally, the clamping force may be applied to at least one third of the outer circumferential surface of the tube 104, between one third to one half of the outer circumferential surface of the tube 104, up to one half of the outer circumferential surface of the tube 104, at least one half of the outer circumferential surface of the tube 104, up to two thirds of the outer circumferential surface of the tube 104, at least two thirds of the outer circumferential surface of the tube 104, etc. Tightening and loosening the fastener 206 may adjust the amount of the clamping force applied to the tube 104. The size of the first tube mounting member 202 or the second tube mounting member 204 may additionally be adjusted based on the clamping force that is to be applied against the tube 104.

In some embodiments, the fastener 206 may have a torque limitation based on a diameter of the fastener 206 and/or the material of the component being fastened, e.g., the first tube mounting member 202, the second tube mounting member 204, etc. Depending on the fastener 206 and materials of the first tube mounting member 202 and the second tube mounting member 204, there may be a torque range for the fastener 206 based on the type of fastener used, the diameter of the fastener 206, and the material of the portion of the component being fastened, e.g., the first tube mounting member 202, the second tube mounting member 204, etc. In an instance where the fastener 206 is over-tightened or over-torqued, any potential damage may be incurred by the fastener 206 rather than first tube mounting member 202, the second tube mounting member 204, or the tube 104. Therefore, an adequate clamping force may be applied while preventing damage to the first tube mounting member 202, the second tube mounting member 204, or the tube 104.

Figure 3B:
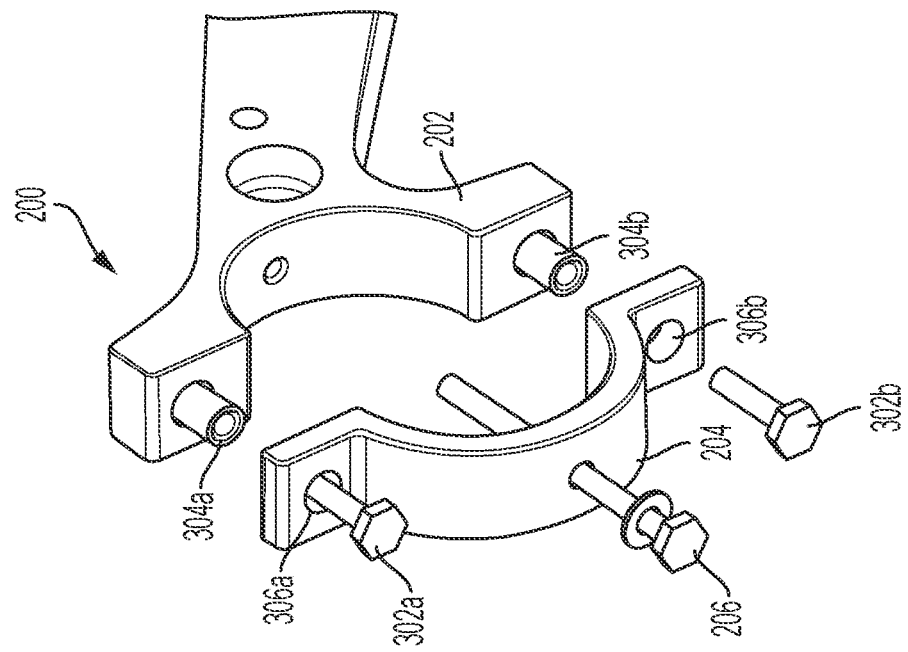
FIG. 3B is a perspective exploded view of the seat frame component mounting system of FIG. 2 according to certain embodiments of the present disclosure.
Figure 3A:
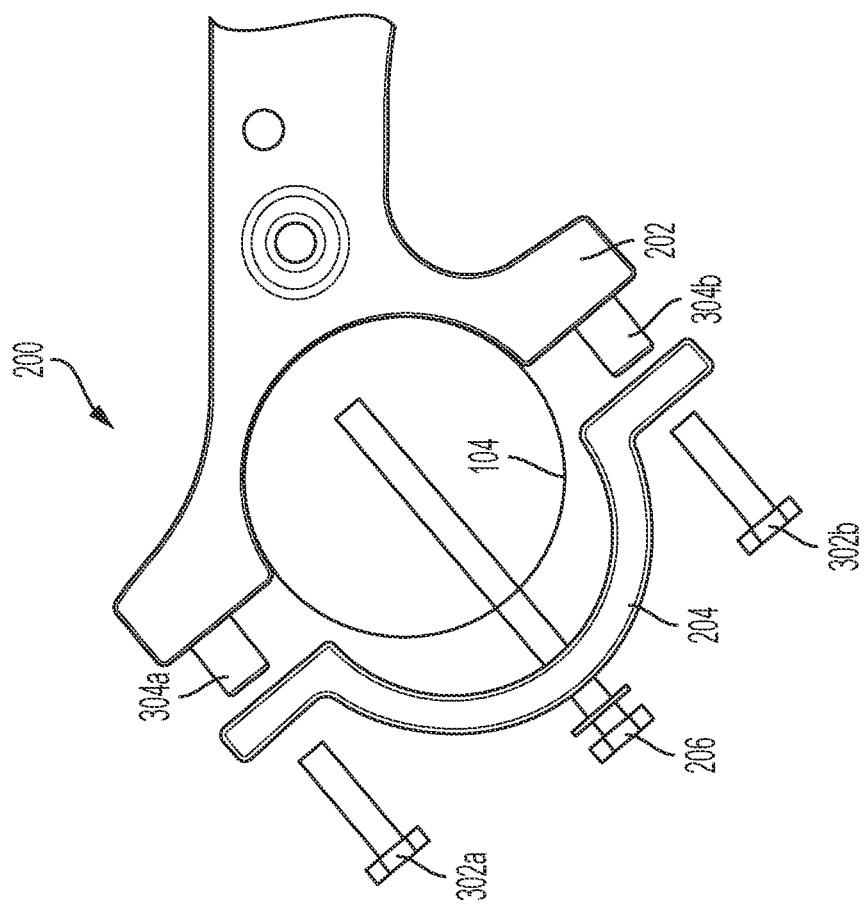
FIG. 3A is a side exploded view of the seat frame component mounting system of FIG. 2 with a seat tube according to certain embodiments of the present disclosure.

As shown in FIGS. 3A-3B, at least one of the first tube mounting member 202 or the second tube mounting member 204 may include at least one guide member 304 and at least one opening 306. Whichever of the first tube mounting member 202 or the second tube mounting member 204 includes the at least one guide member 304, the other of the first tube mounting member 202 or the second tube mounting member 204 may include the at least one opening 306 so that each of the at least one guide members 304 has a corresponding opening 306 through which each of the at least one guide members 304 may extend through. The at least one guide member 304 may be press-fit bushings, pins, or any other suitable mechanical guide members.

For example, as illustrated in FIGS. 3A-3B, the first tube mounting member 202 may include a first guide member 304a and a second guide member 304b, and the second tube mounting member 204 may include a first opening 306a and a second opening 306b. Each of the guide members 304a-b and each of the openings 306a-b may be positioned at equal distances from where the fastener 206 extends through the first tube mounting member 202 and/or the second tube mounting member 204. Additionally, the second tube mounting member 204 may be positioned relative to the first tube mounting member 202 so that the guide members 304a-b substantially align with the openings 306a-b. In fact, the guide members 304a-b may assist in properly aligning the second tube mounting member 204 relative to the first tube mounting member 202. Additionally, aligning the first tube mounting member 202 and the second tube mounting member 204 may involve aligning the first guide member 304a with the first opening 306a and the second guide member 304b with the second opening 306b so that the first guide member 304a and the second guide member 304b extend at least partially through the first tube mounting member 202 via the openings 306a-b.

In some embodiments, at least one second fastener 302 may be coupled to the first tube mounting member 202. As illustrated in FIGS. 3A-3B, the seat frame component mounting system 200 may include at least two second fasteners 302a-b. Examples of the second fasteners 302a-b may include but are not limited to screws, bolts, rivets, or other mechanical or chemical fasteners. The at least one second fastener 302 may extend at least partially through the at least one opening 306, the at least one guide member 304, and the first tube mounting member 202. For example, the second fastener 302a may extend at least partially through the first opening 306a, the first guide member 304a, and the first tube mounting member 202, and the second fastener 302b can extend at least partially through the second opening 306b, the second guide member 304b, and the first tube mounting member 202. In some embodiments, the at least one second fastener 302 does not apply any additional clamping force from the second tube mounting member 204 or the first tube mounting member 202 to the tube 104.

Figure 4:
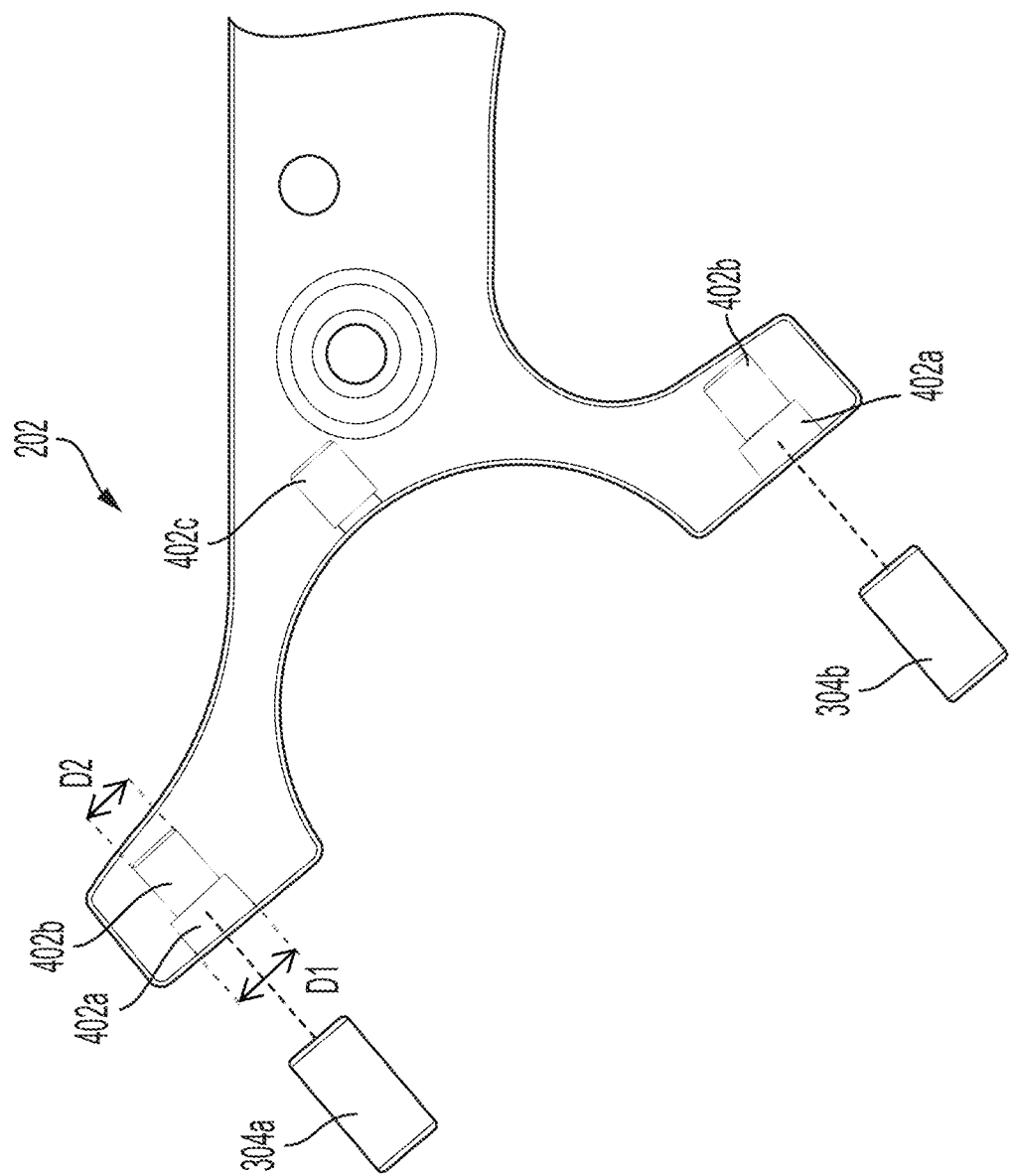
FIG. 4 is a side view of a first tube mounting member of the seat frame component mounting system of FIG. 2 according to certain embodiments of the present disclosure.

As shown in FIG. 4, at least one of the first tube mounting member 202 or the second tube mounting member 204 may include one or more first internal cavities 402a and/or one or more second internal cavities 402b connected to a respective one or more first internal cavities 402a. For example, in the illustrated embodiment, the first tube mounting member 202 includes first internal cavities 402a and second internal cavities 402b connected to the first internal cavities 402a. The first internal cavities 402a and/or second internal cavities 402b may be configured to receive one or more fasteners, such as second fasteners 302a-b, and/or other components. Additionally, at least one of the first tube mounting member 202 or the second tube mounting member 204 may further include a third internal cavity 402c that is configured to receive fastener 206 and/or other components. In some embodiments, one or more of the internal cavities may be at least partially threaded to facilitate coupling with the respective fasteners or other components. One or more of the internal cavities may also be sized to accommodate guide members, such as first guide member 304a and/or second guide member 304b, and/or other components. For example, the first internal cavity 402a may have a first diameter (D1), and the second internal cavity 402b may have a second diameter (D2). In some embodiments, the second diameter D2 may be smaller than the first diameter D1. At least one cylindrical guide member (e.g., first guide member 304a and/or second guide member 304b) or other component may be positioned at least partially within the first internal cavity 402a, but not within the second internal cavity 402b. The at least one cylindrical guide member (e.g., first guide member 304a and/or second guide member 304b) may have a diameter greater than the second diameter D2, thereby preventing it from entering the second internal cavity 402b. Furthermore, the cylindrical guide member (e.g., first guide member 304a and/or second guide member 304b) may include a hollow passageway that extends at least part of the length of the guide member, which may facilitate alignment or passage of components (e.g., second fasteners 302a-b). The guide members 304a-b may be friction-fit, snap-fit, or otherwise retained within the respective first internal cavity 402a.

As shown in FIG. 5, with the first tube mounting member 202 coupled to the second tube mounting member 204 via the fastener 206, there may be a gap 502 between the first tube mounting member 202 and the second tube mounting member 204. The gap 502 may be in an area 504 of the first tube mounting member 202 and the second tube mounting member 204 that includes the at least one opening (e.g., openings 306 in FIG. 3) and the at least one guide member (e.g., guide members 304 in FIG. 3). As illustrated, there is a first gap 502a between the first tube mounting member 202 and the second tube mounting member 204 in a first area 504a of the first tube mounting member 202 and the second tube mounting member 204 that includes the first opening (e.g., first opening 306a in FIG. 3) and the first guide member (e.g., first guide member 304a in FIG. 3), and there is a second gap 502b between the first tube mounting member 202 and the second tube mounting member 204 in a second area 504b of the first tube mounting member 202 and the second tube mounting member 204 that includes the second opening (e.g., second opening 306b in FIG. 3) and the second guide member (e.g., second guide member 304b in FIG. 3). The area 504 of the first tube mounting member 202 and the second tube mounting member 204 that includes the at least one opening and the at least one guide member may be substantially planar.

The gap 502 may permit minor movements of the second tube mounting member 204 relative to the first tube mounting member 202 due to various loads and/or torques applied to the passenger seat. In some embodiments, the minor movements may occur relative to and/or along the axes of the guide members 304. By permitting such minor movements, the seat frame component mounting system 200 may further reduce undesired stresses and loads on the tube 104 thus reducing potential damage to the tube 104.

Figure 6:
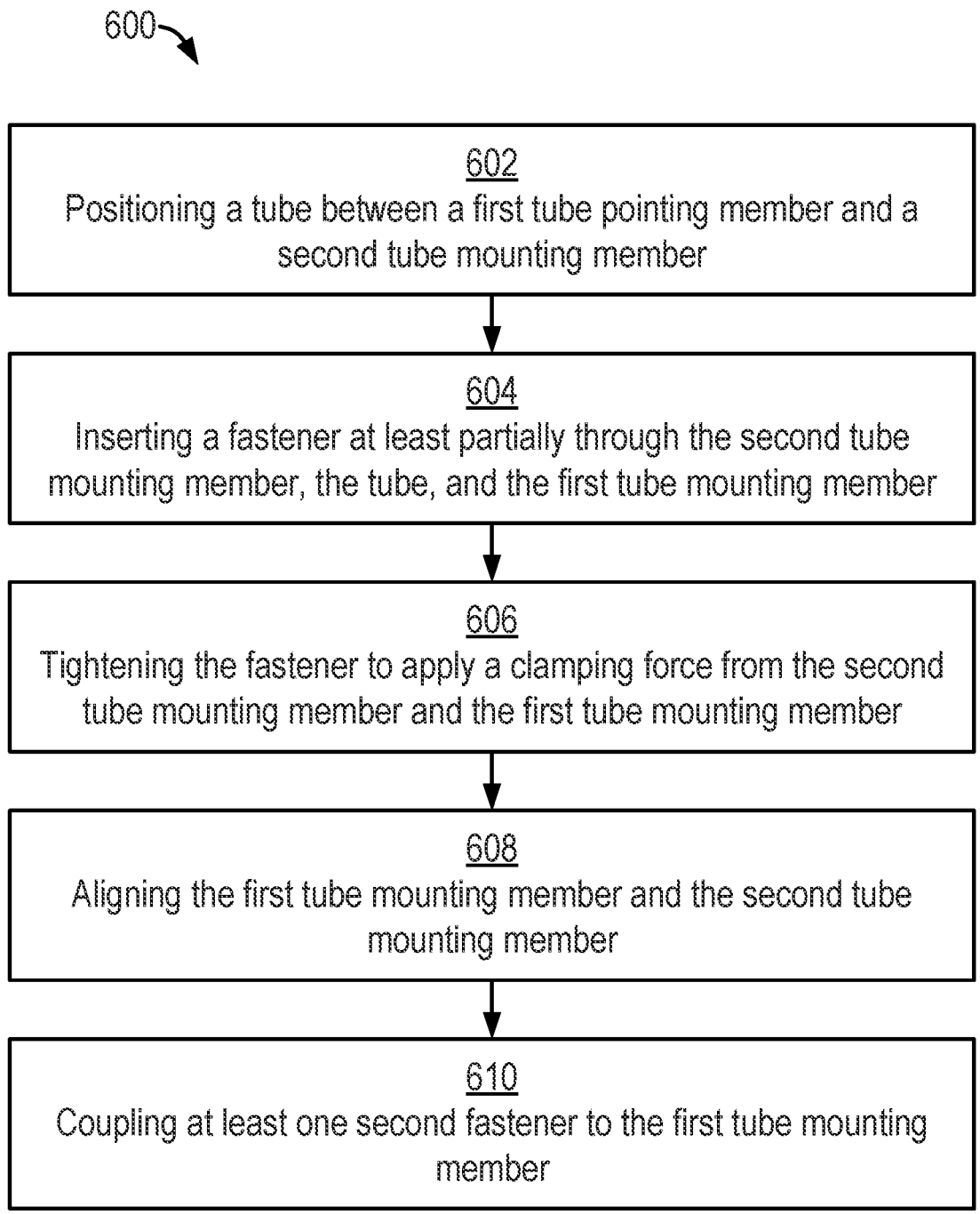
FIG. 6 shows a flowchart for an example method for assembling a passenger seat having a tube and a seat frame component mounting system according to certain embodiments of the present disclosure.

Referring now to FIG. 6, FIG. 6 shows an example method 600 for assembling a passenger seat having a tube and a seat frame component mounting system according to this disclosure. The example method 800 will be discussed with respect to the passenger seat 100 discussed relative to FIG. 1 and the seat frame component mounting system 200 discussed relative to FIGS. 2-5.

At block 602, the tube 104 is positioned between a first tube mounting member 202 and a second tube mounting member 204. The second tube mounting member 204 may be separable from the first tube mounting member 202.

At block 604, the fastener 206 is inserted at least partially through the second tube mounting member 204, the tube 104, and the first tube mounting member 202 to couple the second tube mounting member 204 to the first tube mounting member 202.

At block 606, the fastener 206 is tightened to apply a clamping force from the second tube mounting member 204 and the first tube mounting member 202 substantially evenly against an outer circumferential surface of the tube 104.

At block 608, the first tube mounting member 202 and the second tube mounting member 204 are aligned by aligning the at least one guide member 304 of the at least one of the first tube mounting member 202 or the second tube mounting member 204 with the at least one opening 306 of at least one of the first tube mounting member 202 or the second tube mounting member 204.

At block 610, at least one second fastener 302 is coupled to the first tube mounting member 202. The at least one second fastener 302 may extend at least partially through the at least one opening 306, the at least one guide member 304, and the first tube mounting member 202.

In the following, further examples are described to facilitate the understanding of the invention (and in some aspects, features of an apparatus or system described in one or more of these examples may be utilized in a method described in one of the other examples or vice versa). These examples are not meant to be mutually exclusive, exhaustive, or restrictive; and the disclosure is not limited to these examples but rather encompasses all possible modifications and variations within the scope of the issued claims and their equivalents.

Example 1. A passenger seat (which may incorporate features of any of the subsequent examples) comprising: a tube; and a seat frame component mounting system comprising: a first tube mounting member; a second tube mounting member separable from the first tube mounting member, wherein the tube is positionable between the first tube mounting member and the second tube mounting member; and a fastener extending at least partially through the second tube mounting member, the tube, and the first tube mounting member to couple the second tube mounting member to the first tube mounting member; and wherein a clamping force is substantially evenly applied from the second tube mounting member and the first tube mounting member against an outer circumferential surface of the tube via the fastener.

Example 2. The passenger seat of Example 1 or any of the preceding or subsequent examples, wherein the first tube mounting member is integrally formed with a seat frame component.

Example 3. The passenger seat of Example 1 or any of the preceding or subsequent examples, wherein an entirety of an inner surface of at least one of the first tube mounting member or the second tube mounting member is in contact with at least a portion of the outer circumferential surface of the tube.

Example 4. The passenger seat of Example 1 or any of the preceding or subsequent examples, wherein at least one of the first tube mounting member or the second tube mounting member comprises at least one guide member.

Example 5. The passenger seat of Example 4 or any of the preceding or subsequent examples, wherein the other of the at least one of the first tube mounting member or the second tube mounting member comprises at least one opening.

Example 6. The passenger seat of Example 5 or any of the preceding or subsequent examples, wherein the second tube mounting member is positionable relative to the first tube mounting member so that the at least one guide member substantially aligns with the at least one opening.

Example 7. The passenger seat of Example 6 or any of the preceding or subsequent examples, wherein at least one second fastener is coupleable to the first tube mounting member and extends at least partially through the at least one opening, the at least one guide member, and the first tube mounting member.

Example 8. The passenger seat of Example 6 or any of the preceding or subsequent examples, wherein there is at least one gap between the first tube mounting member and the second tube mounting member in an area of the first tube mounting member and the second tube mounting member comprising the at least one opening and the at least one guide member.

Example 9. A method (which may incorporate features of any of the preceding or subsequent examples) for assembling a passenger seat comprising a tube and a seat frame component mounting system, the method comprising: positioning the tube between a first tube mounting member and a second tube mounting member, wherein the second tube mounting member is separable from the first tube mounting member; inserting a fastener at least partially through the second tube mounting member, the tube, and the first tube mounting member to couple the second tube mounting member to the first tube mounting member; and tightening the fastener to apply a clamping force from the second tube mounting member and the first tube mounting member substantially evenly against an outer circumferential surface of the tube.

Example 10. The method of Example 9 or any of the preceding or subsequent examples, wherein an entirety of an inner surface of at least one of the first tube mounting member or the second tube mounting member is in contact with at least a portion of the outer circumferential surface of the tube.

Example 11. The method of Example 9 or any of the preceding or subsequent examples, wherein at least one of the first tube mounting member or the second tube mounting member comprises at least one guide member and at least one opening.

Example 12. The method of Example 11 or any of the preceding or subsequent examples, further comprising aligning the first tube mounting member and the second tube mounting member by aligning the at least one guide member of the at least one of the first tube mounting member or the second tube mounting member with the at least one opening of at least one of the first tube mounting member or the second tube mounting member.

Example 13. The method of Example 12 or any of the preceding or subsequent examples, further comprising coupling at least one second fastener to the first tube mounting member, wherein the at least one second fastener extends at least partially through the at least one opening, the at least one guide member, and the first tube mounting member.

Example 14. The method of Example 12 or any of the preceding or subsequent examples, wherein there is at least one gap between the first tube mounting member and the second tube mounting member in an area of the first tube mounting member and the second tube mounting member comprising the at least one opening and the at least one guide member.

Example 15. A seat frame component mounting system (which may incorporate features of any of the preceding or subsequent examples) comprising: a first tube mounting member; a second tube mounting member separable from the first tube mounting member and moveable relative to the first tube mounting member along a linear axis; and a fastener extending at least partially through the second tube mounting member and the first tube mounting member to couple the second tube mounting member to the first tube mounting member.

Example 16. The seat frame component mounting system of Example 15 or any of the preceding or subsequent examples, wherein the first tube mounting member is integrally formed with a seat frame component.

Example 17. The seat frame component mounting system of Example 15 or any of the preceding or subsequent examples, wherein the linear axis extends substantially along a central axis extending through the fastener.

Example 18. The seat frame component mounting system of Example 15 or any of the preceding or subsequent examples, wherein at least one of the first tube mounting member or the second tube mounting member comprises at least one guide member and at least one opening.

Example 19. The seat frame component mounting system of Example 18 or any of the preceding or subsequent examples, wherein the second tube mounting member is positionable relative to the first tube mounting member so that the at least one guide member substantially aligns with the at least one opening.

Example 20. The seat frame component mounting system of Example 19 or any of the preceding or subsequent examples, wherein there is at least one gap between the first tube mounting member and the second tube mounting member in an area of the first tube mounting member and the second tube mounting member comprising the at least one opening and the at least one guide member.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A passenger seat comprising:
a tube; and
a seat frame component mounting system comprising:
a first tube mounting member;
a second tube mounting member separable from the first tube mounting member, wherein the tube is positionable between the first tube mounting member and the second tube mounting member; and
a fastener extending at least partially through the second tube mounting member, the tube, and the first tube mounting member to couple the second tube mounting member to the first tube mounting member;
wherein a clamping force is substantially evenly applied from the second tube mounting member and the first tube mounting member against an outer circumferential surface of the tube via the fastener;
wherein at least one of the first tube mounting member or the second tube mounting member comprises a first internal cavity and a second internal cavity connected to the first internal cavity, the first internal cavity having a first diameter and the second internal cavity having a second diameter smaller than the first diameter, and at least one cylindrical guide member positioned at least in part in the first internal cavity but not in the second internal cavity and having a diameter larger than the second diameter, the cylindrical guide member comprising a hollow passageway extending at least part of a length of the at least one cylindrical guide member;
wherein the other of the at least one of the first tube mounting member or the second tube mounting member comprises at least one opening;
wherein at least one second fastener is coupleable to the first tube mounting member, is separable from the at least one cylindrical guide member, and extends at least partially through the at least one opening, the hollow passageway of the at least one cylindrical guide member, and the first tube mounting member;
wherein there is at least one gap between the first tube mounting member and the second tube mounting member in an area of the first tube mounting member and the second tube mounting member comprising the at least one opening and the at least one cylindrical guide member; and
wherein the second tube mounting member is movable relative to the first tube mounting member while coupled to the first tube mounting member, and movement of the second tube mounting member either increases or decreases a size of the at least one gap.

2. The passenger seat of claim 1, wherein the first tube mounting member is integrally formed with a seat frame component.

3. The passenger seat of claim 1, wherein an entirety of an inner surface of at least one of the first tube mounting member or the second tube mounting member is in contact with at least a portion of the outer circumferential surface of the tube.

4. The passenger seat of claim 1, wherein the second tube mounting member is positionable relative to the first tube mounting member so that the at least one cylindrical guide member substantially aligns with the at least one opening.

5. The passenger seat of claim 1, wherein an entirety of an inner surface of each of the first tube mounting member and the second tube mounting member is in contact with at least a portion of the outer circumferential surface of the tube.

6. The passenger seat of claim 1, wherein the movement of the second tube mounting member occurs along and parallel to a longitudinal axis of the at least one cylindrical guide member.

7. A method for assembling a passenger seat comprising a tube and a seat frame component mounting system, the method comprising:
positioning the tube between a first tube mounting member and a second tube mounting member, wherein the second tube mounting member is separable from the first tube mounting member;
wherein at least one of the first tube mounting member or the second tube mounting member comprises a first internal cavity and a second internal cavity connected to the first internal cavity, the first internal cavity having a first diameter and the second internal cavity having a second diameter smaller than the first diameter, and at least one cylindrical guide member positioned at least in part in the first internal cavity but not in the second internal cavity and having a diameter larger than the second diameter, the cylindrical guide member comprising a hollow passageway extending at least part of a length of the at least one cylindrical guide member; and
wherein the other of the at least one of the first tube mounting member or the second tube mounting member comprises at least one opening;
inserting a fastener at least partially through the second tube mounting member, the tube, and the first tube mounting member to couple the second tube mounting member to the first tube mounting member;
tightening the fastener to apply a clamping force from the second tube mounting member and the first tube mounting member substantially evenly against an outer circumferential surface of the tube; and
coupling at least one second fastener to the first tube mounting member, wherein the at least one second fastener is separable from the at least one cylindrical guide member and extends at least partially through the at least one opening, the hollow passageway of the at least one cylindrical guide member, and the first tube mounting member;
wherein there is at least one gap between the first tube mounting member and the second tube mounting member in an area of the first tube mounting member and the second tube mounting member comprising the at least one opening and the at least one cylindrical guide member; and
wherein the second tube mounting member is movable relative to the first tube mounting member while coupled to the first tube mounting member, and movement of the second tube mounting member either increases or decreases a size of the at least one gap.

8. The method of claim 7, wherein an entirety of an inner surface of at least one of the first tube mounting member or the second tube mounting member is in contact with at least a portion of the outer circumferential surface of the tube.

9. The method of claim 7, further comprising aligning the first tube mounting member and the second tube mounting member by aligning the at least one cylindrical guide member of the at least one of the first tube mounting member or the second tube mounting member with the at least one opening of at least one of the first tube mounting member or the second tube mounting member.

10. The method of claim 7, wherein an entirety of an inner surface of each of the first tube mounting member and the second tube mounting member is in contact with at least a portion of the outer circumferential surface of the tube.

11. The method of claim 7, wherein the movement of the second tube mounting member occurs along and parallel to a longitudinal axis of the at least one cylindrical guide member.

12. A seat frame component mounting system comprising:
a first tube mounting member comprising an arcuate portion;
a second tube mounting member comprising an arcuate portion, the second tube mounting member being separable from the first tube mounting member; and
a fastener extending at least partially through the arcuate portion of the second tube mounting member and the arcuate portion of the first tube mounting member to couple the second tube mounting member to the first tube mounting member;
wherein the second tube mounting member is movable relative to the first tube mounting member along and parallel to a linear axis while the second tube mounting member is coupled to the first tube mounting member;
wherein at least one of the first tube mounting member or the second tube mounting member comprises a first internal cavity and a second internal cavity connected to the first internal cavity, the first internal cavity having a first diameter and the second internal cavity having a second diameter smaller than the first diameter, and at least one cylindrical guide member positionable in the first internal cavity but not in the second internal cavity and having a diameter larger than the second diameter, the cylindrical guide member comprising a hollow passageway extending at least part of a length of the at least one cylindrical guide member;
wherein the other of the at least one of the first tube mounting member or the second tube mounting member comprises at least one opening; and
wherein at least one second fastener is coupleable to the first tube mounting member, is separable from the at least one cylindrical guide member, and extends at least partially through the at least one opening, the hollow passageway of the at least one cylindrical guide member, and the first tube mounting member into the second internal cavity.

13. The seat frame component mounting system of claim 12, wherein the first tube mounting member is integrally formed with a seat frame component.

14. The seat frame component mounting system of claim 12, wherein the linear axis extends substantially along a central axis extending through the fastener.

15. The seat frame component mounting system of claim 12, wherein the second tube mounting member is positionable relative to the first tube mounting member so that the at least one cylindrical guide member substantially aligns with the at least one opening.

16. The seat frame component mounting system of claim 15, wherein there is at least one gap between the first tube mounting member and the second tube mounting member in an area of the first tube mounting member and the second tube mounting member comprising the at least one opening and the at least one cylindrical guide member.

17. The seat frame component mounting system of claim 16, wherein movement of the second tube mounting member either increases or decreases a size of the gap, and the movement of the second tube mounting member occurs along and parallel to a longitudinal axis of the at least one cylindrical guide member.

* * * * *